: US 7,387,080 B2
(45) Date of Patent: Jun. 17, 2008

(12) United States Patent
Andronic

(54) PNEUMATIC ACTUATOR MOVEMENT INDICATOR

(75) Inventor: Cristian S. Andronic, Burnaby (CA)

(73) Assignee: Honeywell ASCA Inc., Ontario (CA)

( * ) Notice: Subject to any disclaimer, the term of this patent is extended or adjusted under 35 U.S.C. 154(b) by 22 days.

(21) Appl. No.: 11/386,492

(22) Filed: Mar. 22, 2006

(65) Prior Publication Data

US 2007/0151503 A1  Jul. 5, 2007

Related U.S. Application Data

(60) Provisional application No. 60/754,768, filed on Dec. 29, 2005.

(51) Int. Cl.
*G01L 19/12* (2006.01)

(52) U.S. Cl. .................. 116/267; 116/268; 137/557

(58) Field of Classification Search ........... 116/112, 116/204, 264, 266, 267, 268, 272, 273, 274, 116/275, 276, DIG. 7; 73/170.14; 96/421, 96/422; 137/557
See application file for complete search history.

(56) References Cited

U.S. PATENT DOCUMENTS 3,112,643 A * 12/1963 Lanahan .................. 73/162

3,126,739 A * 3/1964 Whitehill .................. 73/861.47
3,319,924 A * 5/1967 Wilson ...................... 251/26
3,380,470 A * 4/1968 Culpepper, Jr. et al. .... 137/269
3,414,013 A * 12/1968 Jaquith ...................... 137/557
3,974,795 A * 8/1976 Crisp, Jr. .................... 116/267
4,402,224 A * 9/1983 Fukushima .................. 73/705
4,497,434 A * 2/1985 Lawless ...................... 236/23
4,874,012 A * 10/1989 Velie .......................... 137/557
4,963,857 A * 10/1990 Sackett ...................... 340/606
5,542,293 A * 8/1996 Tsuda et al. ................ 73/146.5
5,845,597 A * 12/1998 Karpal ...................... 116/268
6,333,689 B1 * 12/2001 Young ........................ 340/506
2007/0151503 A1 * 7/2007 Andronic .................... 116/267

* cited by examiner

*Primary Examiner*—R. A. Smith
(74) *Attorney, Agent, or Firm*—Scully, Scott, Murphy & Presser PC

(57) ABSTRACT

Disclosed is a pneumatic actuator movement indicator comprising a housing adapted to be connected in series between a pneumatic actuator and a source of pressurized fluid for the actuator, and an indicator located in, and having an equilibrium position in, the housing. The housing includes a first chamber for placing the housing in fluid communication with said actuator at a pressure P1, and a second chamber for placing the housing in fluid communication with said source of pressurized fluid at a pressure P2. The indicator is movable in the housing in response to a difference between P1 and P2. Movement of the pneumatic actuator produces a difference between P1 and P2; and in response to this difference, the indicator moves away from its equilibrium position, indicating the movement of the pneumatic actuator.

14 Claims, 2 Drawing Sheets

PNEUMATIC ACTUATOR MOVEMENT INDICATOR

CROSS REFERENCE TO RELATED APPLICATION

The present application claims priority from U.S. Provisional Application No. 60/754,768 filed on Dec. 29, 2005.

BACKGROUND OF THE INVENTION

1. Field of the Invention

This invention generally relates to pneumatic actuators, and more specifically, relates to an apparatus and method for indicating movement of a pneumatic actuator.

2. Background Art

Pneumatic actuators are very cost effective actuators, and are found in many applications, such as manufacturing, aerospace, and commercial vehicles. Generally, in the operation of, for example, a linear pneumatic actuator, a high-pressure fluid is conducted to the actuator to extend or retract a piston. Movement of the piston may then be used to actuate some other mechanism such as a switch or valve.

Currently, at least in many specific applications, there is no available method to indicate the movement of a pneumatic actuator other than a visual observation through a window located on the actuator body. This feature, though, cannot be used if the actuator is in a very inaccessible area. Also, the window cannot be read from a long distance.

For example, pneumatic actuators are used in sheet making processes to control the amount of steam applied to the formed sheets. In this application, the pneumatic actuator may be mounted on a beam in a relatively inaccessible location and operated from a remote distance. As a result, any window on the actuator body is inaccessible and too far away from the operator to be used to see movement of the actuator. Moreover, the actuator may be enclosed in a protective dust cover, which makes it even more difficult to observe movement of the actuator.

SUMMARY OF THE INVENTION

An object of this invention is to improve pneumatic actuator movement indicators.

Another object of the present invention is to provide an apparatus and a method that will allow an operator to infer movement of the piston of a pneumatic actuator at a significant distance from the actuator.

A further object of the invention is to allow an operator of a pneumatic actuator to remotely infer movement of the actuator piston during a bump test.

These and other objectives are attained with a pneumatic actuator movement indicator comprising a housing adapted to be connected in series between a pneumatic actuator and a source of pressurized fluid for the actuator, and an indicator located in said housing, movable therein, and having an equilibrium position in the housing. The housing includes a first end chamber for placing the housing in fluid communication with said actuator at a pressure P1, and a second end chamber for placing the housing in fluid communication with said source of pressurized fluid at a pressure P2.

The indicator is movable in the housing in response to a difference between said pressures P1 and P2. Movement of the pneumatic actuator produces a difference between pressures P1 and P2; and in response to said produced pressure difference, the indicator moves away from said equilibrium position, thereby indicating said movement of the pneumatic actuator.

The preferred pneumatic actuator movement indicator (PAMI) of the present invention, described below in detail, will allow the operator to remotely infer the movement of the piston of the pneumatic actuator during a bump-test, which is a test in which a spike of high pressure air is conducted to the pneumatic actuator.

In the above-discussed example, where the pneumatic actuators are mounted on a beam in a relatively inaccessible location, the movement indicator can be placed in two different locations: at the beam where the actuators are mounted, or far away from the beam where the pneumatic controllers are installed.

If PAMI is located at the actuator end, the operator will be able to see the external indication; if a fluorescent coating is used, the operator will be able to clearly identify the movement of the piston of the pneumatic actuator by watching the movement of the indicator. Optional, Light Emitting Diode (LED) versions will allow users to infer the movement of the piston from even further distances. If PAMI is located at the Intelligent Distributed Pneumatic (IDP) controller end, the operator will be able to visualize the external indication. This location also allows the operator to diagnose the air path (leak) or the actuator from a significant distance. The operator will be able to diagnose the actuator without opening the protective beam covers. A three-magnet solution, described below, allows the device to work in any position (vertical, oblique, horizontal), making it suitable for any mounting options available on site.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
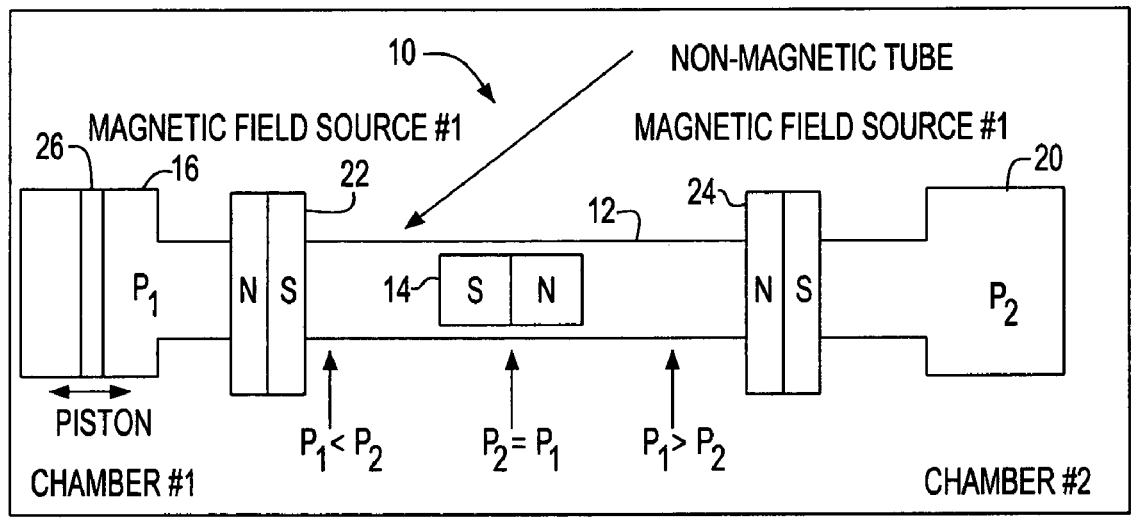
FIG. 1 shows a pneumatic actuator movement indicator (PAMI) embodying this invention.

FIG. 1 shows a pneumatic actuator movement indicator (PAMI) 10 generally comprising a housing or casing 12 and an indicator 14. Housing 12, in turn, includes first and second chambers or end portions 16 and 20. Also, preferably, as illustrated in FIG. 1, indicator 14 is a magnet, and the device 10 includes additional magnets 22 and 24.

Housing chamber 16 is used to place housing 12 in fluid communication with a pneumatic actuator at a pressure P1, and housing chamber 20 is used to place housing 12 in fluid communication with a source of pressurized fluid for the pneumatic actuator at pressure P2. Indicator 14 is located in housing 12 and is movable therein in response to a difference between pressures P1 and P2. One of the housing chambers 16, 20 includes means 26 for expanding its volume, and, for instance, this means may be a piston, a bellows, or other suitable mechanism.

When device 10 is connected in place, the movement of the piston of the pneumatic actuator is inferred through the variation of pressure between the chambers 16 and 20, which causes the movement of the magnetic piece 14. The magnet 14 is maintained in an equilibrium position by the two additional magnetic type devices 22 and 24 that generate opposite magnetic fields with the moving magnet 14. The magnet 14 is moved by the airflow caused by the difference in pressure between the two chambers 16 and 20. The movement amplitude is proportional with the pressure variation and is limited by the position of the two magnets 22 and 24 situated at each end.

In operation, device 10 is mounted in series between a pneumatic actuator and the air source for that actuator. An increase in the source pressure (P2) will move the magnetic indicator 14 from its default-equilibrium position towards the lower pressure area (P1). The device 14 will remain in this position until the pressure P1 becomes equal to P2. The movement of the piston of the pneumatic actuator will cause the magnetic indicator 14 to return to its default position. If the pressure source is lower than the pressure of the piston chamber of the pneumatic actuator, the magnetic indicator 14 will move in the opposite direction.

When the invention is used with a pneumatic actuator that has a ferromagnetic shell, preferably housing 12 is made of plastic or Teflon (non-magnetic material) in order to allow monitoring of the actuator piston. The device 10 can be installed on the actuator end or at the air supply end, allowing the operator to determine the status of the actuator (stuck, leaky, full range active-time based measurement) or the status of the air path (leaks or obstructions in the tube prior to the actuator).

Figure 2:
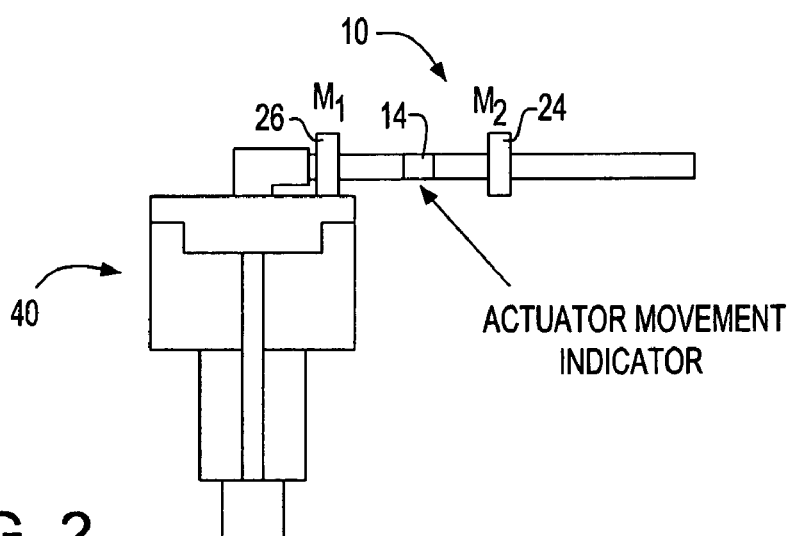
FIG. 2 illustrates the PAMI of FIG. 1 positioned in line between a pneumatic actuator and an actuator air supply.

FIG. 2 illustrates in more detail the implementation of device 10 with a pneumatic actuator 40. The device 10 is attached to the actuator air supply input, either as a single unit or as an assembly made from discrete elements (three magnets). The pressure variation inside the air tube 12 will push the indicator 14 towards one of the magnets 22 and 24 for the period of time while the pressure between the two chambers 16 and 20 is not balanced.

The pneumatic actuator movement indicator disclosed herein is very well suited for use with air/gas type applications but can be used with a wide range of gas and fluid operated actuators. Thus, as the term is used herein, pneumatic actuator refers to a gas or fluid operated actuator. Also, it may be noted that as used herein, the term magnet includes magnetic (rare earth) type devices and electromagnetic type devices. Additionally, means other than magnets can be used to generate the desired forces used to force indicator 14 back to the equilibrium position, and for instance, these forces can be generated by electrical fields.

In addition, the pneumatic actuators with which the present invention is used can themselves be used in a wide range of applications. As one example, represented in FIG. 4, the present invention may be used with a paper or sheet making machine or process.

Figure 3:
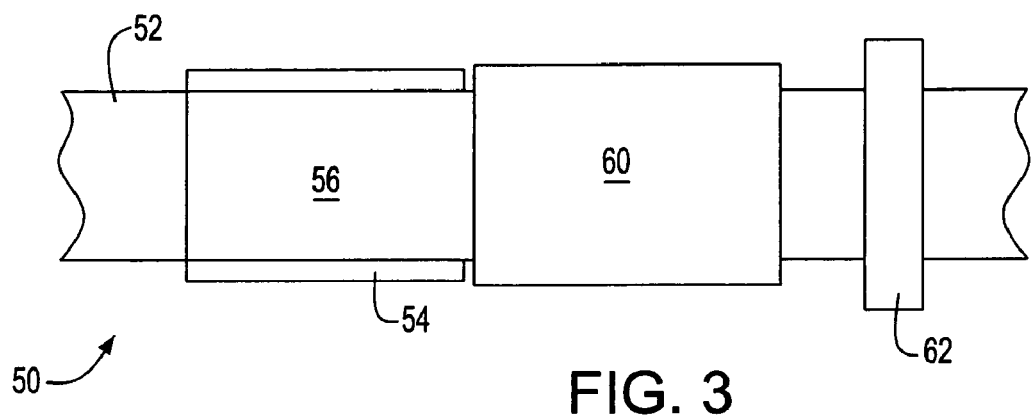
FIG. 3 is a top schematic view of a portion of a sheet-making machine with which the present invention is used.

More specifically, FIG. 3 is a schematic top view of a part of a paper or board machine 50, comprising a headbox 52, from which pulp is fed into a former 54 in which a fiber web 56 is formed of the pulp. The fiber web is dried in a drying section 60, after which a measuring frame 62 is arranged for measuring the machine-direction and cross-direction properties of the fiber web.

Figure 4:
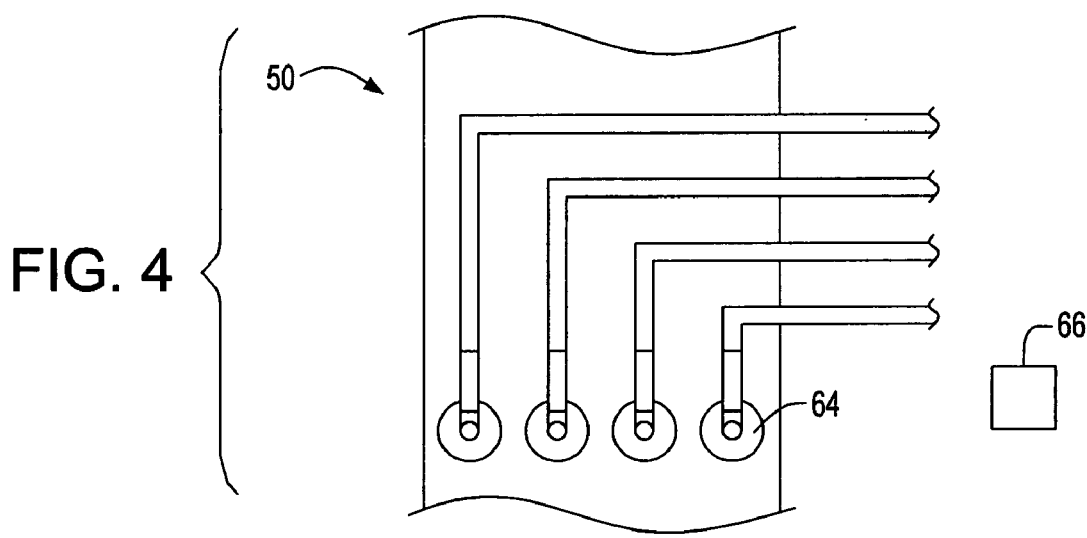
FIG. 4 is a side view of a section of the machine of FIG. 3, showing more specifically the use of the present invention therein.

As particularly represented in FIG. 4, a series of pneumatic actuators 64 are used to control the amount of steam applied to the formed fiber web. These actuators may themselves be controlled, via control unit 66, by an operator at a significant distance from machine 50. Pursuant to the present invention, each of the actuators 64 may be connected to a device 10 to enable the operator to monitor movement of the pneumatic actuator, specifically the piston thereof.

The preferred embodiment of the invention provides a number of important benefits. For instance, the invention provides the ability to detect a leaky actuator, a stuck actuator, a leaky tube/air path, or a sticking or slipping actuator piston. To elaborate, in case of a leaky actuator, the position indicator 14 of device 10 will be off the equilibrium position and will indicate the direction of the leak. In case of a stuck actuator, the position indicator 14 will not move if a large bump test is performed.

In order to detect a leaky tube or air path between the actuator and the air source, a pair of devices 10 are used, one at the actuator end, and one at the controller end. If there is a leak in the tube or air paths between the two devices, then the indicator 14 of the downstream device is in an equilibrium position, while the indicator 14 of the upstream devices will move toward chamber P1 since, in that upstream device, P1 will be lower than P2.

In case of a sticking or slipping actuator piston, the magnetic indicator 14 will not move while the pressure is gradually changed. After the pressure reaches a maximum trigger point, the actuator will move and the magnetic indicator 14 of device 10 will oscillate rapidly before going into the equilibrium or default state. In order to best identify this symptom, it may be preferred to install PAMI 10 at the actuator end.

Figure 5:
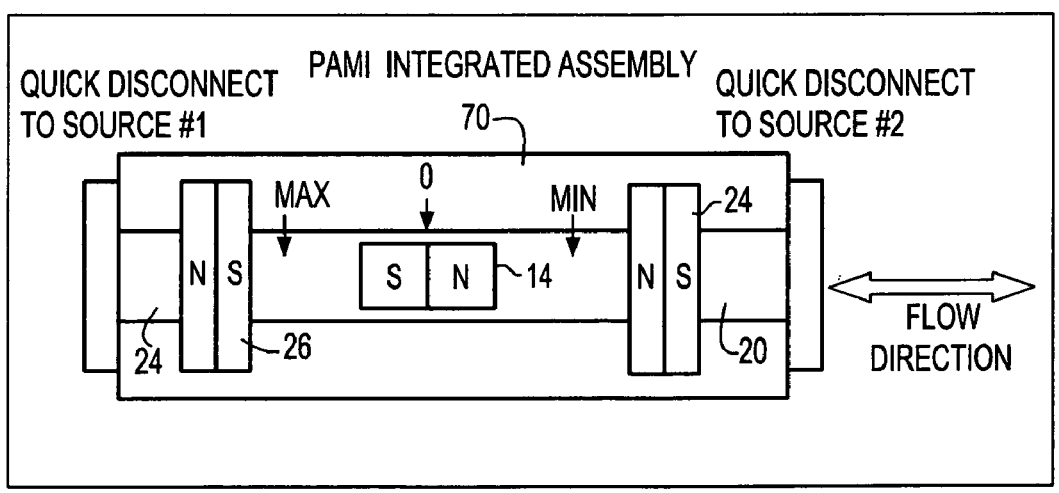
FIG. 5 depicts an alternate pneumatic movement indicator.

Also, as will be understood by those of ordinary skill in the art, a number of variations of the design of device 10 may be made. For example, as depicted in FIG. 5, the design can be integrated into a single piece 70. In addition, as mentioned above, the device 10 can be located at the IDP-controller plate connection. In this case, actuator movement can be monitored remotely by the use of the tool 10 of this invention.

Further, the device 10 can be coated with a reflective-phosphorescent material that will allow operators to identify the movement of the indicator 14 from a distance; the activation of the phosphorescent material can be provided with a simple flashlight. The design can be implemented into an electronic device that will activate an LED to indicate the movement to the operator.

If a very small, or mini, electronic device is built based on the principles of this invention, it will be able to provide accurate timing information through a serial communication. WI-FI communication is an option. For an installation close to the pneumatic actuator, the magnetic indicator 14 can be coated with a material that reacts with the water and/or moisture. A change in color of this coating will identify water inside the actuator and the need for servicing. A colored metal ring or sphere can be mounted outside the tube above the magnetic indicator 14 to show its movement. The design can be applied to denser fluids, such as oil, and water.

The cost of the tool 10 is minimal; a simple configuration requires just three magnets, a tube and two quick disconnect couplers. The permanent magnets 22 and 24 can be customized for different field strengths and are readily available.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A pneumatic actuator movement indicator for use with a pneumatic actuator and a source of pressurized fluid for said actuator, the pneumatic actuator movement indicator comprising:
   a housing adapted to be connected in series between the pneumatic actuator and the source of pressurized fluid, said housing including
   a first end chamber for placing the housing in fluid communication with said actuator at a pressure P1, and
   a second end chamber for placing the housing in fluid communication with said source of pressurized fluid at a pressure P2;
   wherein movement of the pneumatic actuator produces a difference between pressures P1 and P2; and in response to said produced pressure difference, the indicator moves away from said equilibrium position, thereby indicating said movement of the pneumatic actuator; and
   further comprising a biasing source for applying forces to the indicator urging said indicator back into the equilibrium position after the indicator has moved away from said equilibrium position; and
   wherein said biasing source includes:
   a first source secured to the housing on a first side of the indicator and applying a force to the indicator urging said indicator away from the first end chamber of the housing; and
   a second source secured to the housing on a second side of the indicator and applying a force to the indicator urging said indicator away from the second end chamber of the housing.

2. A pneumatic actuator indicator movement indicator for use with a pneumatic actuator and a source of pressurized fluid for said actuator, the pneumatic actuator movement indicator comprising:
   a housing adapted to be connected in series between the pneumatic actuator and the source of pressurized fluid, said housing including
   a first end chamber for placing the housing in fluid communication with said actuator at a pressure P1, and
   a second end chamber for placing the housing in fluid communication with said source of pressurized fluid at a pressure P2; and
   an pneumatic actuator movement indicator located in said housing, between said first and second end chambers, having an equilibrium position in the housing, and movable in the housing in response to a difference between said pressures P1 and P2 for indicating movement of the pneumatic actuator; wherein movement of the pneumatic actuator produces a difference between pressures P1 and P2; and in response to said produced pressure difference, the indicator moves away from said equilibrium position, thereby indicating said movement of the pneumatic actuator; and
   a biasing source for applying forces to the indicator urging said indicator back into the equilibrium position after the indicator has moved away from said equilibrium position; and
   wherein:
   said indicator is a first magnet; and
   said biasing source includes second and third magnets,
   said second magnet is secured to the housing on a first side of the indicator and applies a force to the indicator urging said indicator away from the first end chamber of the housing; and
   said third magnet is secured to the housing on a second side of the indicator and applies a force to the indicator urging said indicator away from the second end portion of the housing.

3. A method for indicating movement of a pneumatic actuator, comprising:
   connecting a pneumatic actuator movement indicator device in series between the pneumatic actuator and a source of pressurized fluid for said pneumatic actuator, said pneumatic actuator movement indicator including a housing and a movable, pneumatic actuator movement indicator;
   placing a first end chamber of said device in fluid communication with said pneumatic actuator at a pressure P1; and
   placing a second end chamber of said device in fluid communication with said source of pressurized fluid at a pressure P2;
   wherein said pneumatic actuator movement indicator is positioned in the housing, between said first and second end chambers, has an equilibrium position in said housing and is movable therein in response to a difference between said pressures P1 and P2 for indicating movement of the pneumatic actuator; and
   wherein movement of the pneumatic actuator produces a difference between pressures P1 and P2; and in response to said produced pressure difference, the indicator moves away from said equilibrium position, thereby indicating said movement of the pneumatic actuator.

4. A method according to claim 3, comprising the further step of equalizing the pressures P1 and P2 after movement of the pneumatic actuator has produced a difference between pressures P1 and P2.

5. A method according to claim 4, wherein the equalizing step includes the step of expanding said first end chamber of the housing when P1 is greater than P2.

6. A method according to claim 3, comprising the further step of applying forces to the indicator urging said indicator back into the equilibrium position after the indicator has moved away from said equilibrium position.

7. A method according to claim 6, wherein said applying step includes the steps of:
   applying a first force to a first side of the indicator urging said indicator away from the first end chamber of the housing; and
   applying a second force to a second side of the indicator urging said indicator away from the second end chamber of the housing.

8. A method according to claim 7, wherein:
   said indicator is a first magnet;
   the step of applying a first force to said indicator includes the step of securing a second magnet to the housing on the first side of the indicator to apply said first force to the indicator; and
   the step of applying a second force to said indicator includes the step of securing a third magnet to the housing on the second side of the indicator to apply said second force to the indicator.

9. An assembly comprising:
   a pneumatic actuator including a moveable piston;
   a source of pressurized fluid for moving said piston; and a movement indicator for indicating movement of said piston, and including a housing having a first end chamber in fluid communication with said pneumatic actuator at a pressure P1, and a second end chamber in fluid communication with said source of pressurized fluid at a pressure P2, and an pneumatic actuator movement indicator located in said housing, between said first and second end chambers, having an equilibrium position in the housing, and movable in the housing in response to a difference between said pressures P1 and P2 is positioned in the housing, between said first and second end chambers;

wherein movement of the piston of the pneumatic actuator produces a difference between pressures P1 and P2; and in response to said produced pressure difference, the pneumatic actuator movement indicator moves away from said equilibrium position, thereby indicating said movement of said piston.

10. An assembly according to claim 9, further comprising a biasing source for applying forces to the indicator urging said indicator back into the equilibrium position after the indicator has moved away from said equilibrium position.

11. An assembly according to claim 10, wherein said biasing source includes:

a first source secured to the housing on a first side of the indicator and applying a force to the indicator urging said indicator away from the first end chamber of the housing; and a second source secured to the housing on a second side of the indicator and applying a force to the indicator urging said indicator away from the second end chamber of the housing.

12. An assembly according to claim 10, wherein:

said indicator is a first magnet;

said biasing source includes second and third magnets;

said second magnet is secured to the housing on a first side of the indicator and applies a force to the indicator urging said indicator away from the first end chamber of the housing; and said third magnet is secured to the housing on a second side of the indicator and applies a force to the indicator urging said indicator away from the second end portion of the housing.

13. An assembly according to claim 9, further comprising means to equalize the pressures P1 and P2 after movement of the piston of the pneumatic actuator has produced a difference between pressures P1 and P2.

14. An assembly according to claim 13, wherein the means to equalize the pressures P1 and P2 includes means to enable said first end chamber of the housing to expand when P1 is greater than P2.

* * * * *